United States Patent [19]
Conti

[11] Patent Number: 5,555,832
[45] Date of Patent: Sep. 17, 1996

[54] APPARATUS FOR MANUFACTURING HOSIERY ITEMS AND KNITTING AND STITCHING MACHINES

[75] Inventor: Andrea Conti, Florence, Italy

[73] Assignee: Conti Complett S.p.A., Milan, Italy

[21] Appl. No.: 279,865

[22] Filed: Jul. 26, 1994

[30] Foreign Application Priority Data

Jul. 30, 1993 [IT] Italy .................. FI93A0151

[51] Int. Cl.⁶ .............. B26D 1/12; B26D 7/06; D05B 7/00
[52] U.S. Cl. .......... 112/470.155; 83/107; 83/155; 83/602; 112/155; 112/130; 112/285
[58] Field of Search ............ 112/163, 285, 112/288, 292; 26/7, 17, 15 R; 83/107, 155

[56] References Cited

U.S. PATENT DOCUMENTS

| | | |
|---|---|---|
| 3,407,632 | 10/1968 | Ide . |
| 3,450,075 | 6/1969 | Bridgeman . |
| 3,834,331 | 9/1974 | Raisin et al. . |
| 4,147,081 | 4/1979 | Pellaton .................. 83/107 X |
| 4,363,251 | 12/1982 | Carlson .................. 83/155 X |

FOREIGN PATENT DOCUMENTS

| | | |
|---|---|---|
| 0149295 | 7/1985 | European Pat. Off. . |
| 2373976 | 7/1978 | France . |
| 3805234 | 8/1989 | Germany . |
| 528869 | 11/1940 | United Kingdom . |
| 1078462 | 8/1967 | United Kingdom . |

*Primary Examiner*—Rinaldi I. Rada
*Assistant Examiner*—Boyer Ashley
*Attorney, Agent, or Firm*—Guido Modiano; Albert Josif

[57] ABSTRACT

A method for manufacturing hosiery items, termed "top-to-top" method, and the related modified knitting and stitching machines. The method includes the following steps: knitting a first hosiery item starting from a top down to a toe; knitting at least one row of trim at the end of the toe; knitting a second hosiery item at the end of the row of trim starting from a second toe up to a second top; separating and stitching the first and second hosiery items initially joined by the trim row by means of a specifically modified stitching machine. The stitching machine includes two independent stitching units which are fed by a common conveyor which is provided with a cutter and with diverging traction means. Top-to-top knitting can be performed with appropriately modified mechanically-programmed machines or with electronically programmed machines. The advantage of the method is that it considerably increases productivity and almost completely eliminates the waste of excess thread that occurs with current operations for stitching the toes of individually knitted hosiery items.

9 Claims, 7 Drawing Sheets

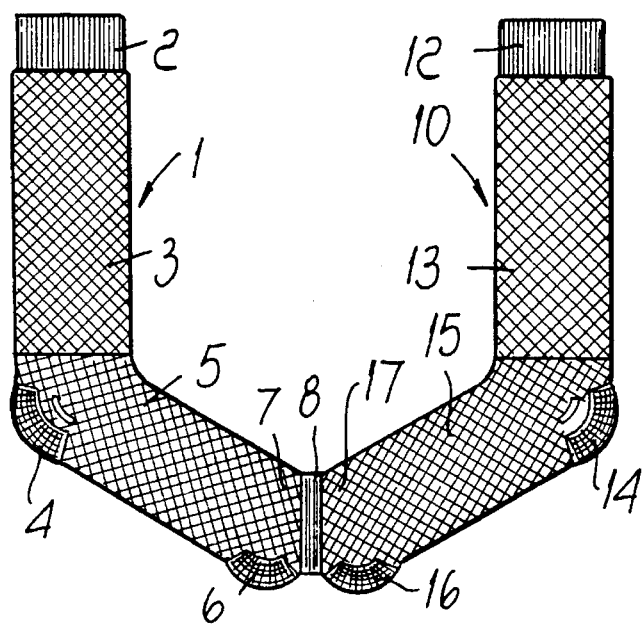
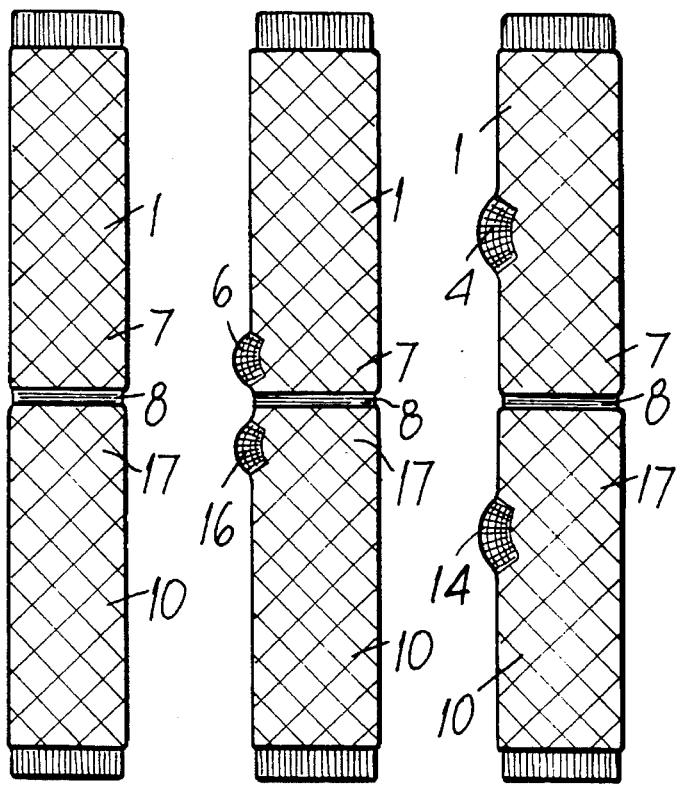
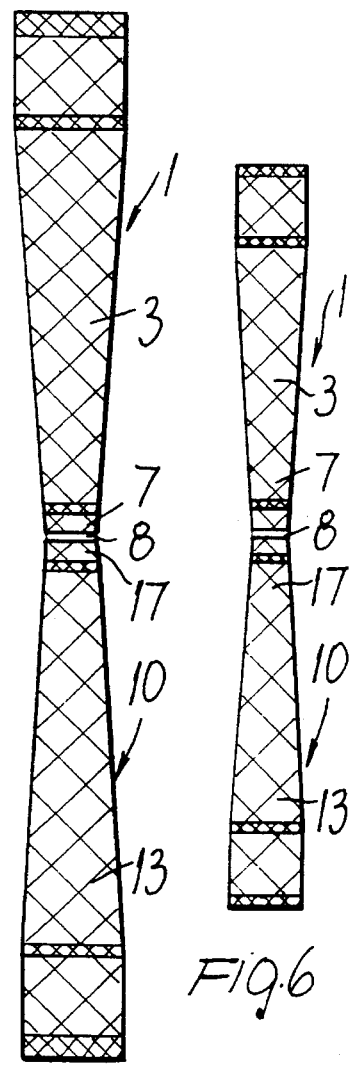

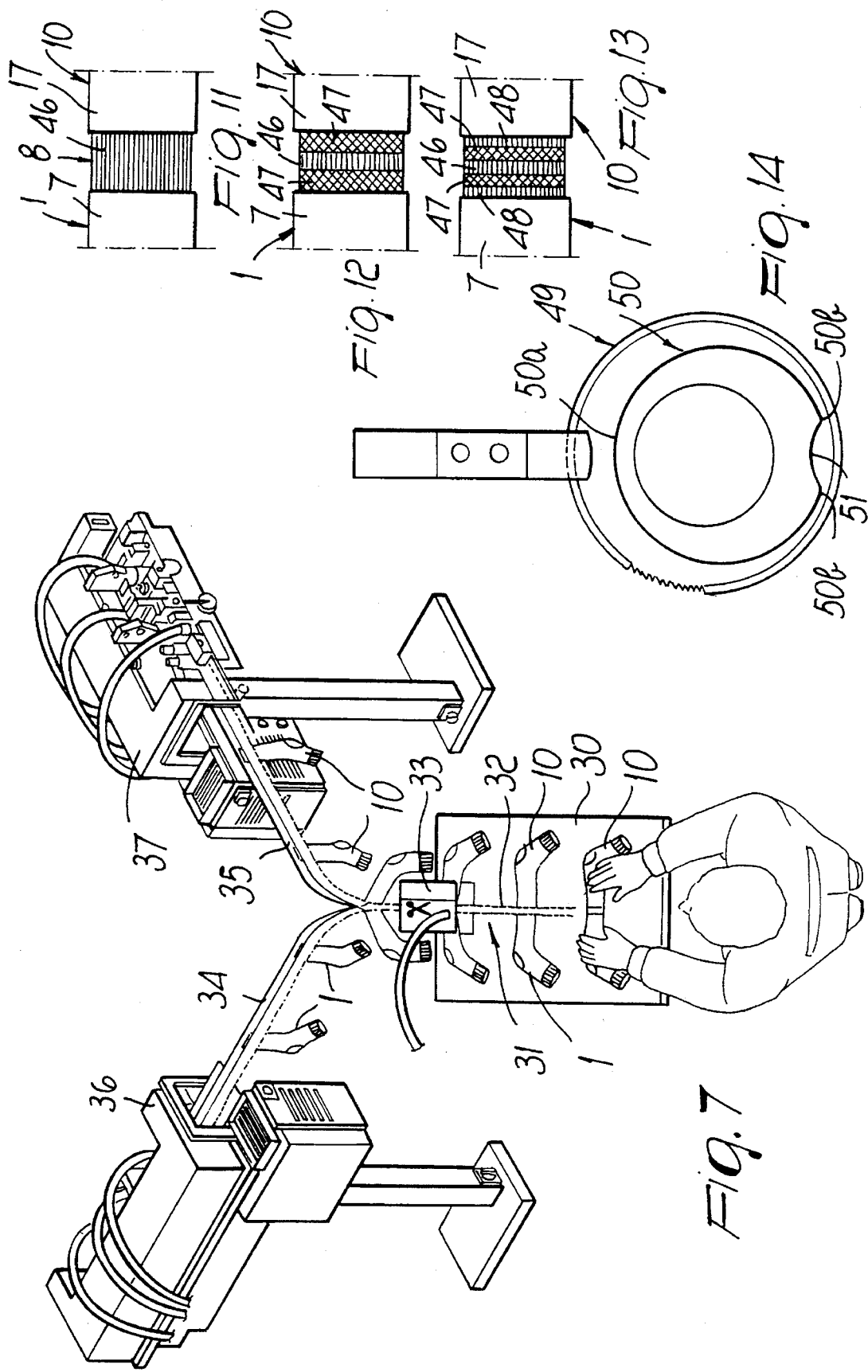

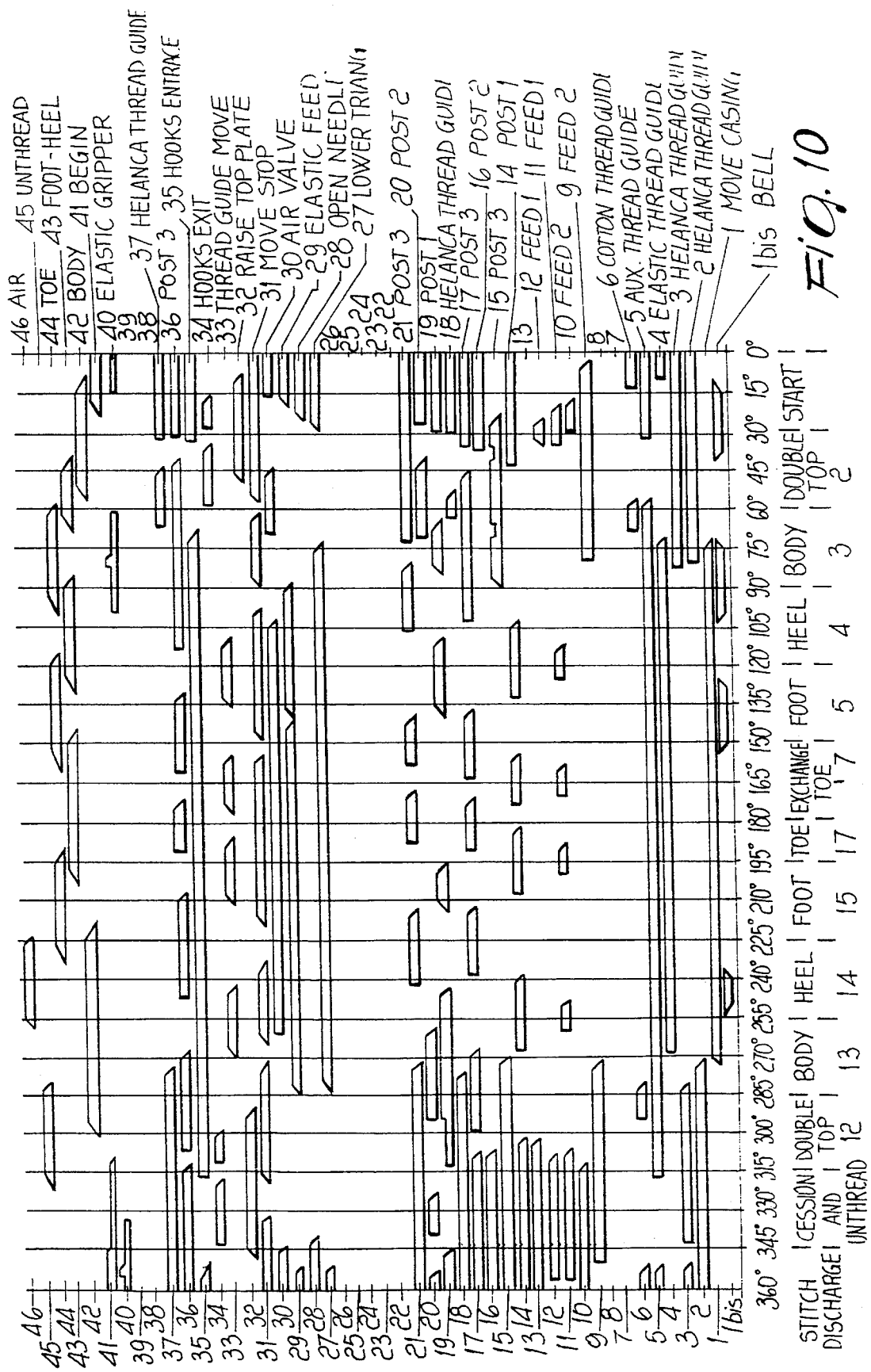

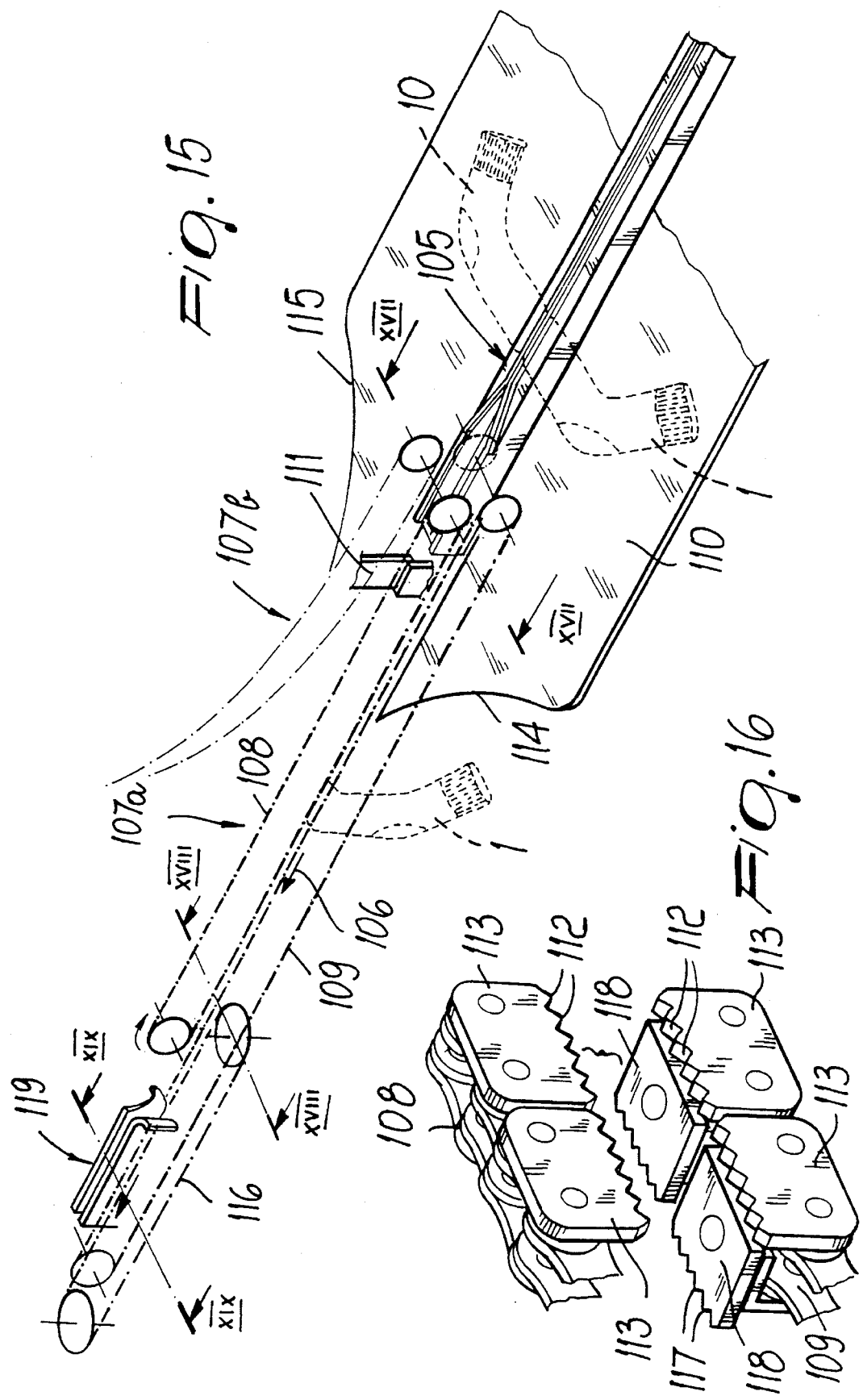

APPARATUS FOR MANUFACTURING HOSIERY ITEMS AND KNITTING AND STITCHING MACHINES

BACKGROUND OF THE INVENTION

The present invention relates to the textile field and more specifically relates to a method for manufacturing hosiery items such as socks, stockings, pop socks and the like, and to the related improved knitting and toe stitching machines therefor.

Hosiery items such as socks, stockings, pop socks and the like, hereinafter generically termed "hosiery", are currently knitted mainly by means of high-speed circular machines starting from the top down to the toe or vice versa.

These machines have electronic or mechanical programming that controls the relative movements of needles, hooks, thread guides and other components and elements of the machine in order to obtain different kinds of knitting according to the different effects to be provided on the item of hosiery.

For example, a hosiery item such as a sock is currently manufactured by knitting the following portions in succession: double top, body, heel, foot, and toe. A few rows of "trim", i.e. rows with very loose stitches, are usually knitted after the toe, followed by a thicker trimming and by a hemstitch. At this point the thread guides are raised and the threads are cut.

When knitting ends, the hosiery items still have a tubular shape which is open at the level of the toe, and it is necessary to stitch this toe; this stitching is currently often performed with automatic stitching machines that require an operator to load the hosiery items manually one by one. Chain means move the hosiery items towards heads for cutting the waste constituted by the hemstitch, by the trimming and by part of the trim rows, and stitch the open toe so that the hosiery items have perfectly and uniformly closed toes.

Although some stitching machines for hosiery items, such as for example those manufactured in Italy by the companies Rosso, Conti Complett and Exacta, have achieved very high working speeds, a limit to productivity is set by the fact that each hosiery item is inserted manually and the operator must be careful to stretch the end part of the toe that includes the trimming, which is normally curled and uneven at the end of the knitting. This trimming must in fact lie on one side of an insertion guide, whereas the rest of the hosiery item must be on the opposite side, and the trim rows are made to slide in the guide until the traction means grip them.

Accordingly, the presence of the trimming after the trim rows has the purpose of ensuring correction insertion on the guide, although it entails a waste of thread which is hardly negligible for large-scale productions such as those normally occurring in this sector. Furthermore, the incidence of the time wasted by the operator to fit each hosiery item on the stitching machine on the cost of each hosiery item is very important, since this operation currently cannot be automated.

Some toe stitching machines, such as for example those manufactured by the United States company Detexomat, instead fit the hosiery items on tubular guides, from which they are then picked up by traction means that take them to be stitched. With these machines the positioning time of the operator is shorter, but the waste of thread is significantly higher, as the hosiery items need a double trimming after the trim rows and in any case still require that one hosiery item at a time be loaded.

SUMMARY OF THE INVENTION

A principal aim of the present invention is to provide a method for manufacturing hosiery items, such as socks, stockings, pop socks and the like, which allows to overcome the drawbacks described above: in other words, to considerably increase productivity and almost completely eliminate the waste of excess thread required for toe stitching operations.

An object of the present invention is to provide an improved circular machine for knitting hosiery items that embodies the manufacturing method according to the invention.

Another object of the invention is to provide an improved or modified stitching machine for stitching the toes of hosiery items manufactured with the method according to the invention so as to allow said considerable increase in productivity and savings in terms of thread waste as well as savings on general consumption and lower wear, caused by each manufactured item, to which the machines are subjected.

According to the invention, there is provided a method for manufacturing hosiery items which comprises the steps of knitting a first hosiery item starting from a top down to a toe and of knitting at least one row of trim stitches at the end of said toe, and which has the characteristic that it comprises the additional steps of: knitting a second hosiery item at the end of said row of stitches starting from a second toe up to a second top.

The first and second hosiery items, joined by this row of stitches, are then inserted together on a toe stitching machine improved or modified according to the present invention.

Said stitching machine comprises two independent stitching units which are fed by a common conveyor that has an inlet guide in which said row of stitches, interposed between the first and second hosiery items, engages. There are also means for cutting said row of stitches and traction means which are suitable to move the first and second hosiery items towards said cutting means and then, along separate paths, towards said two independent stitching units.

As regards the knitting, hereinafter termed "top-to-top" knitting, of said first and second hosiery items, a modified circular knitting machine according to the invention, with mechanical programming based on a drum whose lateral surface is used through 360° of its extension with cams for the actuation of knitting elements, has the characteristic that said lateral surface is substantially engaged over the first 180° by cams which are suitable to weave said first hosiery item and substantially over the second 180° by cams which are suitable to knit the second hosiery item.

BRIEF DESCRIPTION OF THE DRAWINGS

The particular characteristics and advantages of the present invention will become apparent from the following description of some preferred embodiments thereof, given by way of non-limitative example with reference to the accompanying drawings, wherein:

FIG. 1 is an elevation view of a first hosiery item and of a second hosiery item joined by trim rows at the level of the toes with the method according to the invention;

FIGS. 2, 3 and 4 are elevation views of three pairs of hosiery items joined by their toes as in FIG. 1, respectively of the tube type, of the tube type with a toe, and of the tube type with a heel;

FIGS. 5 and 6 are elevation views of a stocking and of a pop sock, respectively, joined by their toes as in FIG. 1;

FIG. 7 is a perspective top view of a stitching machine according to the invention;

FIG. 10 is a schematic view of a cam program that corresponds to the spread of a drum of a mechanically-programmed circular machine for knitting hosiery items, modified according to the invention;

FIGS. 11, 12 and 13 are partial elevation views of three different embodiments of the trim rows provided between the toes of a first hosiery item and of a second hosiery item knitted with the method according to the invention;

FIG. 14 is a top view of a special cam for weaving a double stocking by means of the circular machine modified according to the invention;

FIG. 15 is a schematic perspective view of another embodiment of the conveyor of the stitching machine;

FIG. 16 is a perspective view of an enlarged detail of the traction means of the conveyor of FIG. 15;

DESCRIPTION OF THE PREFERRED EMBODIMENTS

Figure 8:
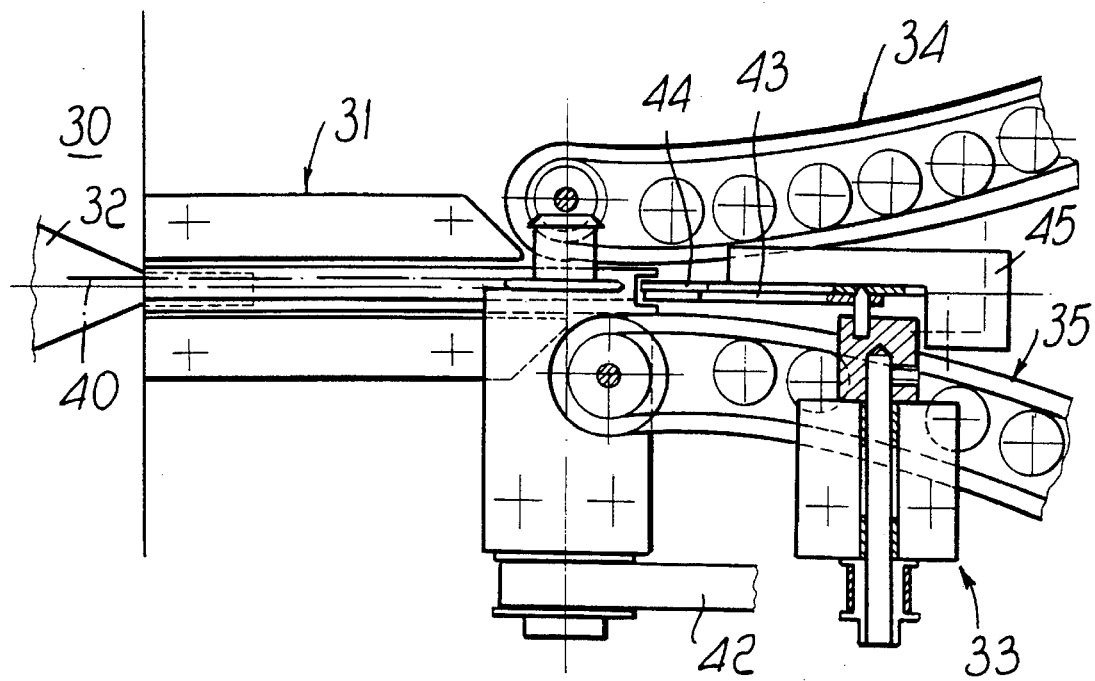
FIGS. 8 and 9 are respectively a top sectional view and a lateral sectional view of a detail of a conveyor provided with cutting means of the machine of FIG. 7.

With reference to FIG. 1, according to the invention, a first hosiery item 1 has been knitted starting from a double top 2 made of elastic thread and cotton, subsequently continuing with a body 3 made of cotton and helanca, with a heel 4 made of terry cloth or towelling, with a foot 5 made of towelling, cotton and helanca with a towelling gusset 6 on the toe 7. After said toe, some helanca trim rows 8 have been knitted, subsequently continuing with a second toe 17 with a second towelling gusset 16, with a second foot 15 with a second heel 14, a second body 13, and a second double top 12, thus forming a second hosiery item 10.

The top-to-top knitting method described above has allowed to obtain a first hosiery item 1 and a second hosiery item 10 which are joined by their toes 7 and 17 by means of the trim rows 8. The two steps for knitting the first hosiery item 1 and the second hosiery item 10, performed for example with a known circular machine modified as described hereafter, allow a considerable saving in terms of time, as the already described steps of the knitting of the two trimmings, as well as the downtimes for ending and removing the first hosiery item and starting the knitting of the second hosiery item, are eliminated. Said two steps furthermore allow saving in terms of waste of thread required to knit the trimmings, the hemstitches and a common trim row for the two hosiery items, as well as the other already mentioned savings.

The same advantages also arise from the knitting of hosiery items as shown in FIGS. 2 to 6, as well as from the top-to-top knitting of other hosiery items, such as for example tubular gloves, thick socks, etcetera. The top-to-top knitting of a first hosiery item and of a second hosiery item which are mutually different, for example a normal hosiery item and a thick sock, is equally advantageous, since even in this case there are savings in resources and thread.

With reference to FIG. 10, knitting according to the above described method is possible by means of a circular machine with mechanical programming based on a drum in which the cams, which have different shapes and lengths and are arranged along the entire lateral cylindrical surface of the drum of which FIG. 10 illustrates a spread, actuate the movements of the various knitting elements, such as thread guides for each different thread type, movements of needles, hooks and other auxiliary elements whose operation is certainly known to a technician in the field and therefore is not described in detail. According to the invention, along the 360° arc of the spread of FIG. 10 the first 180° are dedicated to the knitting of the first hosiery item 1, and the second 180° are dedicated to the knitting of the second hosiery item 10. At each turn of the drum shown in FIG. 10, the circular machine is thus capable of knitting the two hosiery items 1 and 10 starting from the top 2 to the second top 12.

The second hosiery item 10 is thus knitted in reverse with respect to the first hosiery item 1, but this reversal is inconsequential in terms of aesthetic differences or of different effects that can be noted by a person wearing both. The technique of knitting pantyhose, which are knitted toe-to-toe and in which the second body is formed in reverse with respect to the first one without this being evident to the wearer, is in fact well-known.

Of course, in the case of the top-to-top knitting of two different hosiery items the drum of the circular machine is divided into two parts which are substantially proportional to the number of elementary operations required to knit each one of the two hosiery items.

If the hosiery item must have lines and patterns, obtained by frequently swapping threads of different colors, on its body, the operations that in current machines used to be actuated along the full 360° arc by the cams provided on the drum are actuated, in the machine modified according to the invention, by using an auxiliary line forming unit, which is also of a known type and is already used in the field for similar purposes. The line forming unit is used for example to produce colored bands in the upper part of the body or to produce patterns.

As regards the top-to-top knitting of stockings and pop socks, as mechanically-programmed circular machines are currently unable to perform knitting with oppositely arranged tapers as shown in FIGS. 5 and 6, there is a special cam 49 which is shown in FIG. 14. Said cam has a substantially heart-shaped profile 50 which comprises a shallower portion 50a and two higher portions 50b. The axis of the cam passes at the midpoint between the shallower portion 50a and the recess 51 provided between the two higher portions 50b. The weaving elements are actuated by a tracer, not shown, that follows the profile 50, actuating the knitting cams, which produce a gradual tapering and widening in knitting the body 3 and the body 13, respectively, of the hosiery item 1 and of the hosiery item 10. When the tracer stops at the level of the shallower portion 50a and of the recess 51, the rotation of the cam 49 stops and the tops 2 and 12 and the toes 7 and 17 are knitted. The insertion of the cam 49 in an existing circular machine replaces the cam currently used for the simple top-to-toe taper.

In newly manufactured machines in which electronic programming has replaced mechanical programming based on drums, top-to-top knitting with the method according to the invention can of course be obtained easily by means of programming that any technician is capable of performing.

With reference to FIG. 7, in order to pass from the double hosiery item, as shown in FIGS. 1 to 6 and the like, to the final product wherein the toe is stitched, a modified stitching machine according to the invention comprises a feed table 30 at which there is a conveyor 31 that comprises a guide 32 in which the rows of trim 8 engage, with a hosiery item 1 and a hosiery item 10 arranged respectively on the sides of said guide. The conveyor 31 moves the hosiery items 1 and 10 towards a cutter 33 in which they are separated and then advanced along separate paths towards conveyors 34 and 35 that belong respectively to independent stitching units 36 and 37 of a type that has been known for decades in the field and is currently marketed by various companies, some of which have been mentioned in the introduction.

As clearly shown in FIG. 7, the operator has no difficulty in stretching the hosiery items 1 and 10 respectively with his right and left hands and in inserting them in the guide 32 of the conveyor 31. The time required for these insertion operations is in fact much shorter than the time currently taken by an operator to insert a single hosiery item in the guides of a conventional stitching machine, since as described he must manually stretch the hemstitch and the trimming that have curled at the end of the stitching step and carefully insert the trim rows in said guide.

The time saved by the operator in insertion can be advantageously used to insert another pair of hosiery items 1 and 10 on a similar stitching machine modified according to the invention with a second conveyor 31 that converges onto the same feed table 30. In this manner, the productivity of a single operator assigned to feeding the toe stitching machines is multiplied by four with respect to the conventional method. Furthermore, there is a significant advantage in terms of thread saving, as the waste previously indispensable to knit the trimmings that had to be subsequently eliminated together with the hemstitches is avoided.

Figure 9:
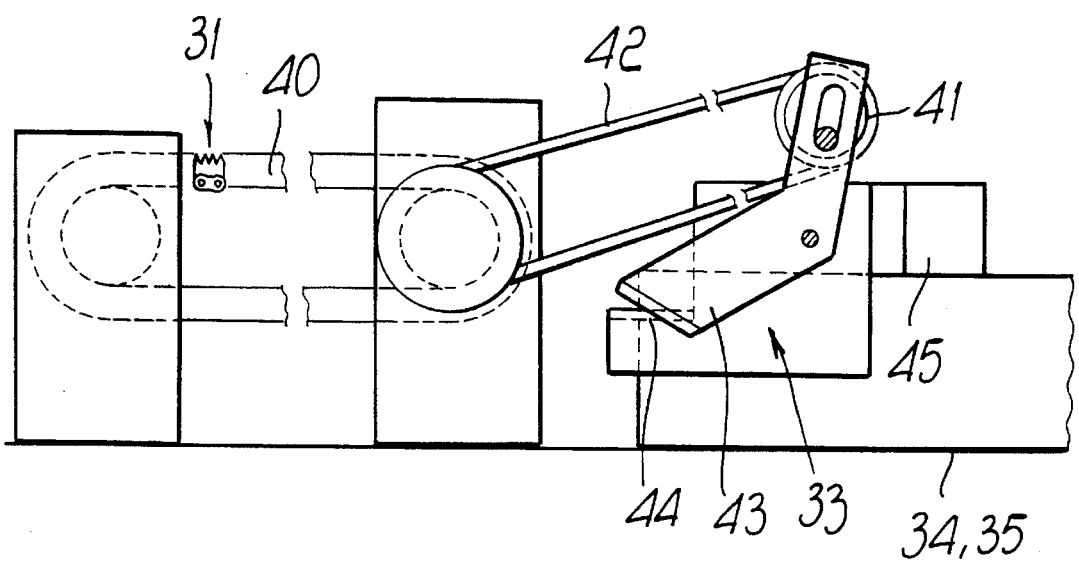
Figure 17:
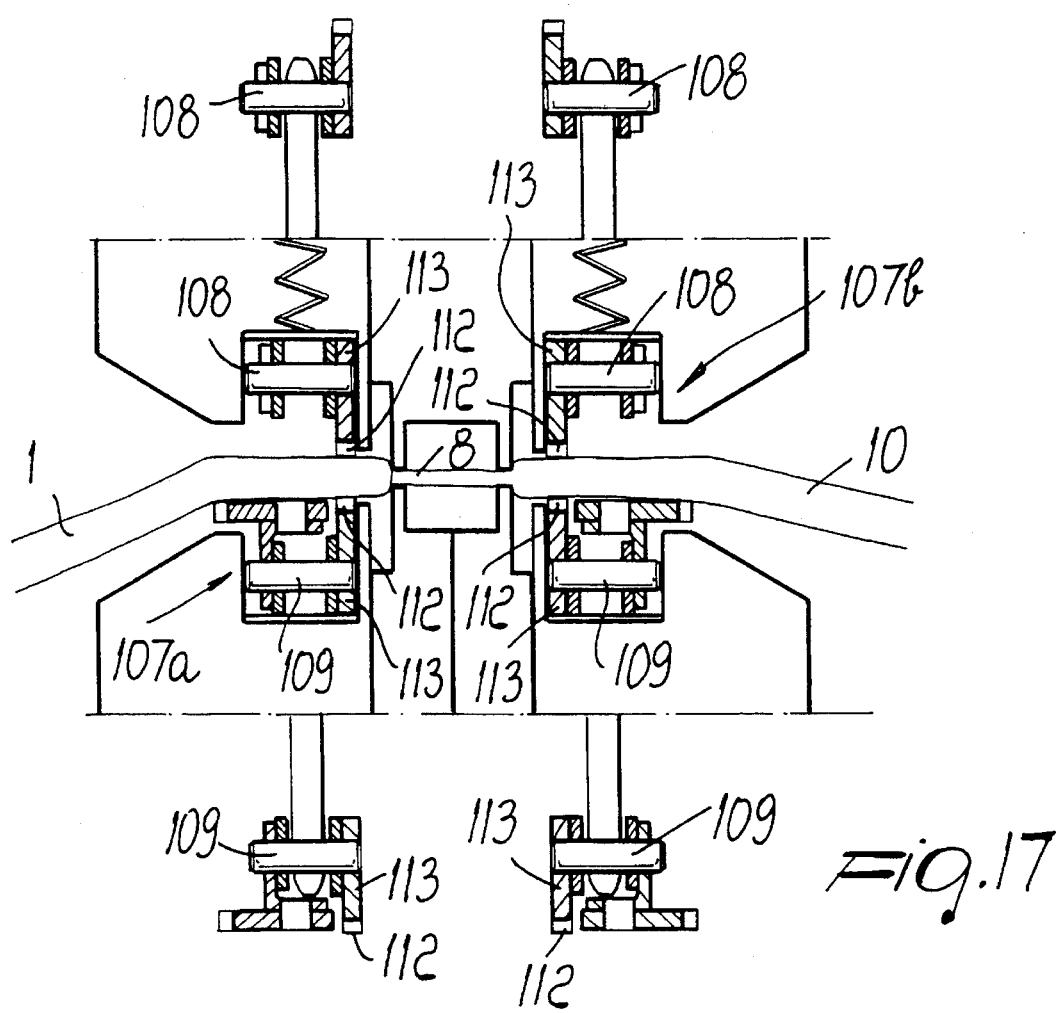
FIG. 17 is a schematic and enlarged sectional view of FIG. 15, taken along the axis XVII.
Figure 18:
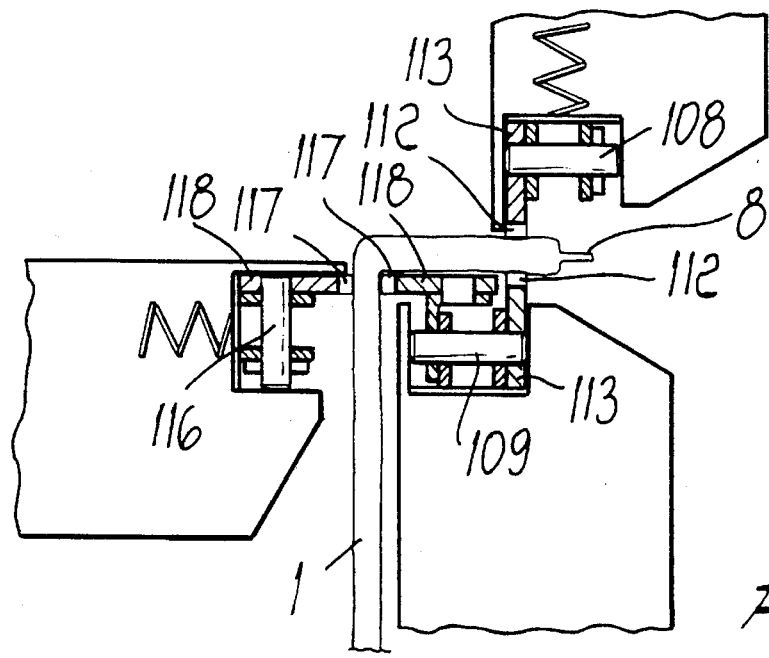
FIG. 18 is a schematic and enlarged sectional view of FIG. 15, taken along the axis XVIII—XVIII.
Figure 19:
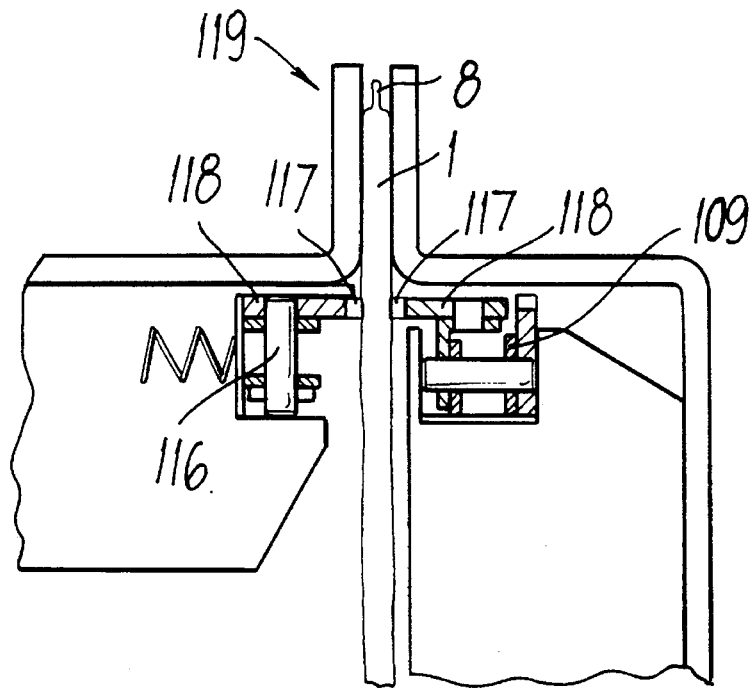
FIG. 19 is a schematic and enlarged sectional view of FIG. 15, taken along the axis XIX—XIX.
Figure 20:
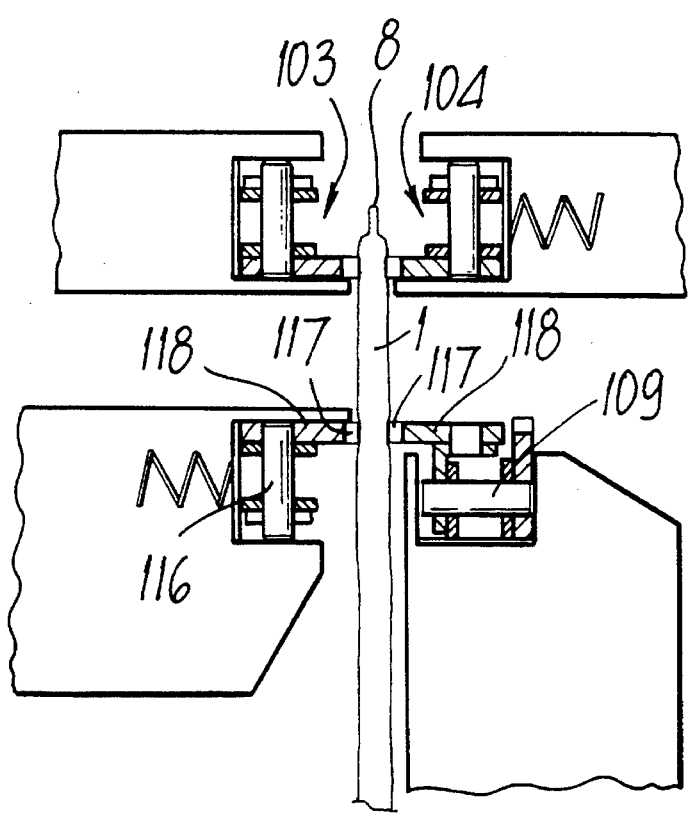
FIG. 20 is a schematic and enlarged sectional view, similar to FIG. 19, at the inlet of one of the stitching units.

With reference to FIGS. 8 and 9, a conveyor 31 is shown in detail and comprises a toothed chain 40 which is suitable to engage in the trim rows provided between the hosiery items 1 and 10, not shown here, and to move them towards the cutter 33 driven by an eccentric element 41 which moves in step with the chain 40 by means of a transmission belt 42. The eccentric element 41 actuates a pivoting blade 43 which moves in a reciprocating manner with respect to a counterblade 44 which is rigidly coupled to a frame 45 from which the conveyors 34 and 35 diverge. As seen in FIGS. 8 and 9, the eccentric element 41 comprises a cylinder which is rotatable about a rotation axis by means of the transmission belt 42, and an eccentric pin protruding from the rotating cylinder eccentrically with respect to its rotation axis. The eccentric pin is slidably engaged in a slot providing in an arm of the pivoting blade 43, thereby to provide the reciprocating movement of the blade 43 upon rotation of the eccentric element cylinder.

In order to allow easy engagement by the conveyors 34 and 35, the trim rows 8, in addition to having the simple shape shown in FIG. 11, in which they are constituted by rows of helanca stitches 46, may also have the shape shown in FIGS. 12 and 13. More precisely, in FIG. 12 they are formed by a series of cotton rows 47 which is interposed between two series of helanca rows 46 which are adjacent to the toes 7 and 17, whereas in FIG. 13 they are formed by a series of rows of helanca stitches 48 interposed between two series of rows of cotton stitches 47 which are in turn interposed between two series of rows of helanca stitches 46 which are adjacent to the toes 7 and 17. Cotton can in fact be easily engaged by the conveyors, but helanca is inserted more easily between the guides of the stitching machines.

FIGS. 15 to 20 illustrate another embodiment of the conveyor and of the means for causing the advancement of the hosiery items to feed two known stitching units, each of which has a feeder which is constituted by a pair of chains 103 and 104 which face each other along a vertical plane with one of their portions in order to retain in a substantially vertical plane the toe of the hosiery item 1 and 10 which is to be stitched.

More particularly, in the embodiment shown in these figures the conveyor comprises an inlet guide 105 on which the operator places the two hosiery items 1 and 10, joined at the toe, stretching them so as to widen the row of trim 8 that joins them.

Downstream of the guide 105 in the direction 106 along which the hosiery items advance towards the stitching units there are two pairs of chains 107a and 107b in which the chains 108 and 109 of each pair comprise an upper chain 108 and a lower chain 109 which face each other with one of their portions at the horizontal feed table 110 on which the hosiery items are placed by the operator. The upper chain 108 and the lower chain 109 are provided with first retention means which engage one of the two hosiery items at the trim row 8 to clamp it parallel to the feed table 110. The two pairs of chains 107a and 107b are arranged side by side along the advancement direction 106, and the cutting means 111 are arranged between the two pairs of chains 107a and 107b proximate to their beginning.

The cutting means 111 can be constituted by a cutter of the type described with reference to FIGS. 8 and 9, whose actuation is synchronized with the actuation of the chains 107a and 107b.

The first retention means are constituted by first serrations 112 which are formed by plates 113 that are applied to the links of the chains 108 and 109 and are arranged on a plane that is substantially at right angles to the feed table 110.

The feed table 110 has, downstream of the cutting means along the advancement direction 106, two lateral recesses 114 and 115, one for each pair of chains 107a and 107b, so that the related hosiery item 1 and 10 drops with its portion located outside the chains 108 and 109 and arranges itself vertically. The lower chain 109 of each pair of chains 107a or 107b has a final or terminal portion that extends beyond the related upper chain 108 and is provided with second hosiery item retention means that cooperate with second retention means mounted on an auxiliary chain 116 which is arranged laterally with respect to the lower chain 109.

Said second retention means are constituted, like the first retention means, by second serrations 117 formed by plates 118 applied to the links of the chains 109 and 116. Differently from the serrations 112, the serrations 117 are arranged, on the portions of the chains 109 and 116 that face each other, on a plane which is parallel to the feed table 110 so as to clamp the hosiery item 1, 10 proximate to the toe 7, 17 on a substantially vertical plane.

Downstream of the upper chain 108 along the advancement direction 106, between the lower chain 109 and the auxiliary chain 116, there is a straightening guide 119 inside which the portion of the hosiery item located between the serrations 117 and the trim row 8 engages so that said portion of the hosiery item arranges itself on a substantially vertical plane in order to be engaged correctly by the chains 103 and 104 of the feeder of the related stitching unit.

As an alternative, the upper chain 108, the lower chain 109, and the auxiliary chain 116 may be replaced with a pair of chains, not shown for the sake of simplicity, which have serrations for retaining the hosiery item and extend along a helical path to transfer the hosiery item from the horizontal position, on the feed table 110, to the vertical position directly upstream of the chains 103 and 104 of the feeder of the related stitching unit.

The method for manufacturing hosiery items, the modified circular machine, and the modified stitching machine according to the invention can be altered and/or modified without thereby abandoning the protective scope of said invention.

What is claimed is:

1. A stitching machine for stitching toes of first and second hosiery items knitted so as to have a trim row which mutually interconnects the toes of said first and second hosiery items, said machine comprising;
    a conveyor for conveying first and second hosiery items along an advancement direction;
    an inlet guide provided on said conveyor for engaging a trim row mutually interconnecting toes of said first and second hosiery items;
    cutting means for cutting said trim row engaged by said inlet guide for separating said first and second hosiery items placed on said conveyor into separated first and second hosiery items; and two independent stitching units;
    wherein said conveyor has traction means for transporting said separated first and second hosiery items along separate paths, from said cutting means to said two independent stitching units.

2. The machine of claim 1, wherein said cutting means comprise;
    a supporting frame supporting said conveyor;
    a fixed counter-blade rigidly coupled to said supporting frame of said conveyor;
    a rotating eccentric element and
    a movable blade actuated by said rotating eccentric element with a reciprocating motion with respect to said fixed counter-blade;
    wherein said traction means comprises:
        a first toothed chain of said conveyor; and
        two additional conveyors located downstream of said cutting means for engaging toes of separated hosiery items and guiding them along said separate paths towards said two independent stitching units.

3. The machine of claim 1, wherein said conveyor comprises:
    a horizontal feed table;
    two pairs of chains, each of said two pairs of chains comprising an upper chain and a lower chain; and
    first retention means provided on said upper chain and said lower chain of one of said pairs of chains, for engaging a first hosiery item proximate to a trim row and clamping a first hosiery item parallel to said feed table;
    wherein said two pairs of chains face each other along an advancement direction, and wherein said cutting means are arranged between said two pairs of chains.

4. The machine of claim 3, wherein said first retention means comprise first serrations, and wherein said each of said two pairs of chains comprise links, said first serrations being connected to said links and arranged substantially at right angles with respect to said feed table.

5. The machine of claim 3, wherein said cutting means comprise a movable cutter, and means for moving said cutter synchronously with respect to the motion of said chains along said advancement direction.

6. The machine of claim 3, wherein said feed table comprises;
    two lateral recesses located downstream of said cutting means with respect to said advancement direction, whereby to allow first and second hosiery items gripped between said chains to hang vertically;
    a terminal portion defined by said lower chain of each of said pairs of chains and extending beyond said upper chain of each of said pairs of chains in said advancement direction;
    a pair of auxiliary chains each one of which is arranged laterally to a respective said lower chain of each of said pairs of chains; and
    second retention means connected to each one of said auxiliary chains for clamping a hosiery item in a substantially vertical plane, upstream of each of said two independent stitching units.

7. The machine of claim 6, wherein said second retention means comprise second serrations, and wherein each one of said pair of auxiliary chains and each said respective said lower chain of each of said pairs of chains comprise links, said second serrations being connected to said links and being arranged substantially parallel to said feed table.

8. The machine of claim 3, wherein said feed table comprises;
    two lateral recesses located downstream of said cutting means with respect to said advancement direction, whereby to allow first and second hosiery items gripped between said chains to hang vertically;
    a terminal portion defined by said lower chain of each of said pairs of chains and extending beyond said upper chain of each of said pairs of chains in said advancement direction;
    a pair of auxiliary chains each one of which is arranged laterally to a respective said lower chain of each of said pairs of chains; and
    second retention means connected to each one of said auxiliary chains for clamping a hosiery item in a substantially vertical plane, upstream of each of said two independent stitching units;
    the machine further comprising:
        an inlet connected to each of said two independent stitching units; and
        for each pair of said two pairs of chains, a hosiery straightening guide located downstream of the upper chain with respect to said advancement direction between
        the lower chain and the auxiliary chain of a respective pair of chains of said two pairs of chains, for straightening and lying a portion of a hosiery item between said second retention means and said trim row in a substantially vertical plane, upstream of said inlet.

9. A stitching machine for stitching toes of first and second hosiery items knitted so as to have a trim row which mutually interconnects the toes of said first and second hosiery items, said machine comprising;
    a conveyor for conveying first and second hosiery items along an advancement direction;
    an inlet guide provided on said conveyor for engaging a trim row mutually interconnecting toes of said first and second hosiery items;
    a cutter for cutting said trim row engaged by said inlet guide for separating said first and second hosiery items placed on said conveyor into separated first and second hosiery items; and two independent stitching units;

wherein said conveyor has traction elements for transporting said separated first and second hosiery items along separate paths, from said cutter to said two independent stitching units.

* * * * *